Nov. 9, 1926.
C. A. WETZELL
TOY AUTOMOBILE AND DRIVER
Filed Oct. 3, 1924
1,606,460
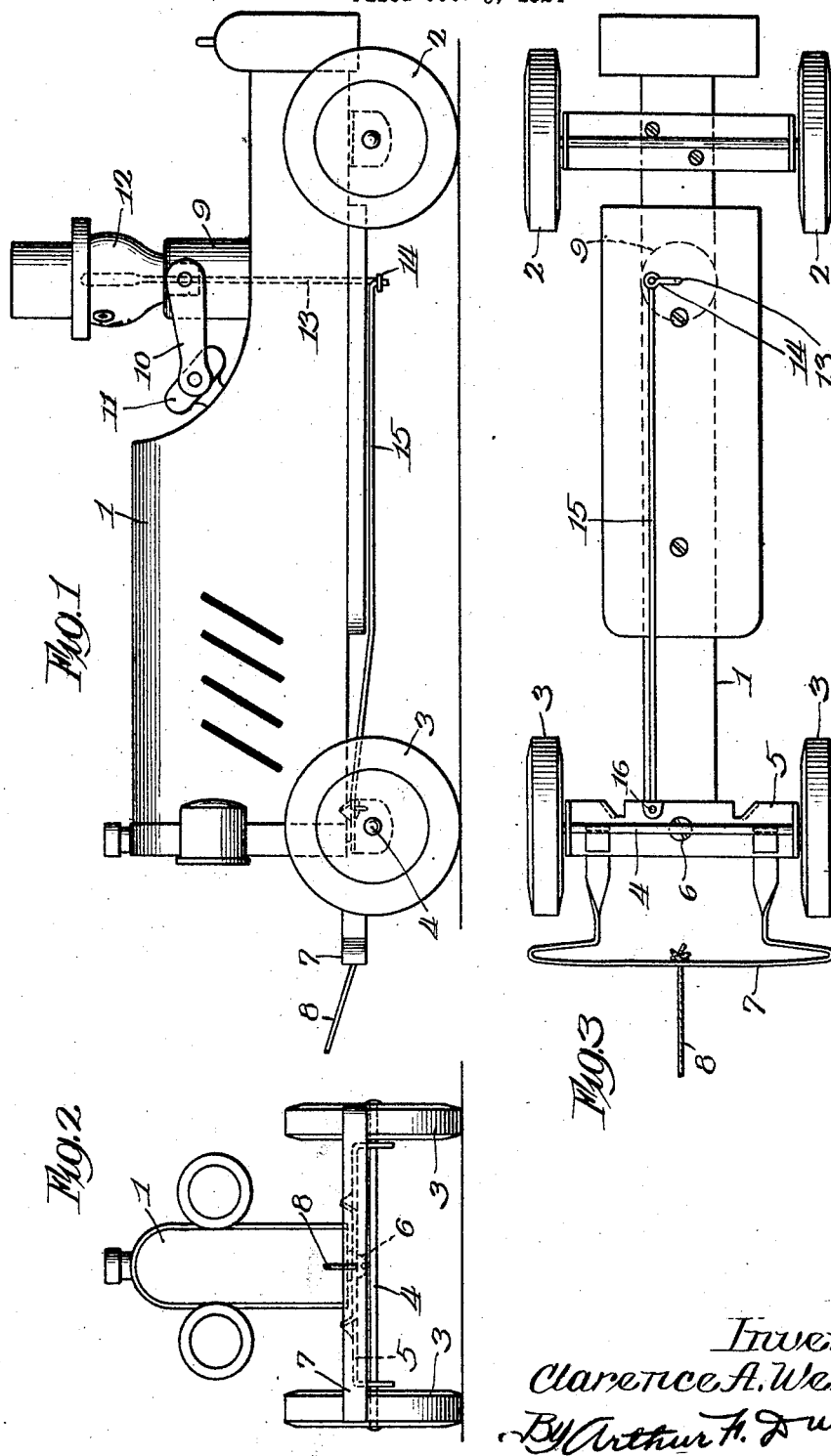
Inventor:
Clarence A. Wetzell
By Arthur F. Durand
Atty Patented Nov. 9, 1926.

1,606,460

UNITED STATES PATENT OFFICE.

CLARENCE A. WETZELL, OF STERLING, ILLINOIS.

TOY AUTOMOBILE AND DRIVER.

Application filed October 3, 1924. Serial No. 741,323.

This invention relates to mechanical toys in general, but more particularly to those which represent a vehicle and driver therefor.

Generally stated, the object of the invention is to provide a novel and improved construction whereby the head of the driver is automatically turned to the right or the left, by the steering means in front, whereby the head of the figure representing the driver will face in the direction in which the toy, such as a motor vehicle, is turned from its course, either to the right or the left.

It is also an object to provide certain details and features of construction tending to increase the general efficiency and the desirability of a mechanical toy of this particular character.

To these and other useful ends, the invention consists in matters hereinafter set forth and claimed, and shown in the accompanying drawings in which:—

Fig. 1 is a side elevation of a toy motor vehicle and driver therefor embodying the principles of the invention.

Fig. 2 is a front elevation of said toy.

Fig. 3 is a bottom plan of said toy.

As thus illustrated, the invention comprises a body 1 which represents the body of a racing car, which is provided with rear wheels 2 and front wheels 3, and is in various ways made to have the appearance of a little racing motor car. The front wheels are mounted on the axle 4 carried by the bolster 5, which latter is pivoted at 6 upon the under side of the front end portion of the body, so that the bolster and axle turn or swing about a vertically disposed pivot. The bumper 7 is attached to said bolster, and a pull string 8 is attached to said bumper.

The driver comprises a body 9 forming the torso of the figure, having arms 10 which reach out and engage the simulated steering wheel 11 of the little racing car. The driver has a head 12 which is swiveled to turn about a vertically disposed axis, a rod or wire 13 being extended upwardly through the body 1 for this purpose, and being fixed in the head 12, whereby oscillation of this rod or wire in the body 1 and torso 9 will turn the head to the right or the left. The lower end of the rod or wire 13 is bent to form a crank 14, and the end of this crank is connected by a rod 15 with the pivot 16 on the bolster 5 previously mentioned. With this arrangement, and the with pivotal point 16 located a distance to one side of the pivot 6, the movement of the bolster 5 about its pivot 6 will cause the rod 15 to oscillate the rod or wire 13, one way or the other, thereby to turn the head 12 to the right or the left.

Thus, when the pull string 8 is swung to one side, causing the bolster 5 to turn about its pivot 6, the head 12 of the driver will turn or face in the same direction, and in this way the driver has the appearance of looking to the right or the left, whenever the direction of travel of the little racing car is changed. For example, if the car turns to the right, the driver turns his head to the right, and if the car turns to the left the driver turns his head in the other direction and looks to the left, in a natural or characteristic manner. Thus the toy has a head which is automatically controlled by the pull string, and is automatically controlled by a steering device or means, but the head and the steering device do not turn about the same axis, but turn about vertically disposed axes arranged some distance apart.

What I claim as my invention is:—

1. A steerable toy, having means to simulate a motor vehicle, a controllable motion figure thereon, simulating the animate driver thereof, said vehicle having steering means whereby the vehicle may be steered to the right or the left, means to simulate a steering wheel, said figure having arms engaging said wheel, and controlling means operative by said steering means to automatically control said figure, interposed as connection between said figure and steering means, causing said figure to have movement when the vehicle is turned to the right or the left, and serving to hold the figure against motion when the vehicle is traveling straight ahead.

2. A structure as specified in claim 1, said figure having a fixed body and a swiveled head which turns to the right or the left, automatically, only when said steering means turn to the right or the left, the swivel of said head being connected below with said controlling means.

3. A structure as specified in claim 1, and a pull connection attached to said steering means, whereby said pull connection automatically controls the action of said figure.

4. A structure as specified in claim 1, said steering means comprising a pivoted front axle and wheels, and said figure having a movable head controlled by said axle, through the medium of said connecting means.

5. A toy automobile, steering means therefor, to steer the toy to the right or the left, means to simulate a controllable driver therefor, constructed to automatically look to the right or the left only when the toy turns in either direction, automatic controlling means for causing such motion of the driver, interposed as connection between the figure and the steering means, serving to prevent any motion thereof when the vehicle is traveling straight ahead, said steering means being movable to the right or the left relatively to the rear portion of the vehicle in which said figure is seated, and means to simulate a steering wheel in front of said driver.

Specification signed this 26th day of Sept. 1924.

CLARENCE A. WETZELL.